Figure 1:
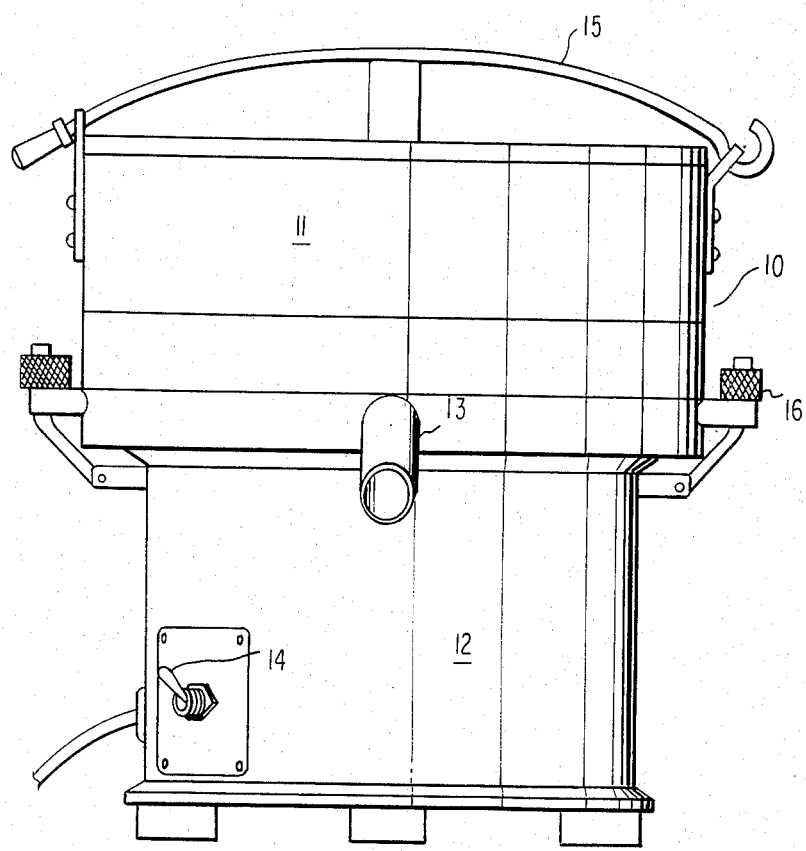

United States Patent [19]

Ramirez et al.

[11] Patent Number: 4,506,601
[45] Date of Patent: Mar. 26, 1985

[54] JUICE EXTRACTOR WITH AUTOMATIC PULP DISCHARGE

[76] Inventors: Justo F. Ramirez; Justo D. Ramirez, both of Garibaldi 1385, Guadalajara, Jal. C. Postal 44660, Mexico

[21] Appl. No.: 493,889

[22] Filed: May 12, 1983

[30] Foreign Application Priority Data

May 17, 1982 [MX] Mexico ................................. 192713

[51] Int. Cl.³ ............................................. A23N 1/00
[52] U.S. Cl. ......................................... 99/511; 99/513
[58] Field of Search ................ 99/456, 458, 460, 465, 99/495, 501, 503, 509-513, 631, 633; 100/116, 125, 156; 210/113, 369-371, 372-376, 280; 241/277, 278 R, 279, 280

[56] References Cited

U.S. PATENT DOCUMENTS

| 2,180,877 | 11/1939 | Lorenzen | 99/512 |
| 2,527,695 | 10/1950 | Bennett | 99/511 |
| 4,034,664 | 7/1977 | Hassell | 99/511 |
| 4,183,293 | 1/1980 | Arao et al. | 99/513 X |

FOREIGN PATENT DOCUMENTS

| 705001 | 3/1954 | United Kingdom . |
| 936329 | 9/1963 | United Kingdom . |
| 1048408 | 11/1966 | United Kingdom . |
| 1354518 | 5/1974 | United Kingdom . |
| 1380318 | 1/1975 | United Kingdom . |

Primary Examiner—Timothy F. Simone
Attorney, Agent, or Firm—Beveridge, DeGrandi & Weilacher

[57] ABSTRACT

A juice extractor is disclosed for juicing fruits and vegetables including a base containing an electric motor, a cutting disk, openings for introducing the fruits and vegetables for obtaining the juice and extracted pulp, a filter basket for collecting the pulp and a device for controlling the flow of pulp from the filter basket. The device enables the pulp to be squeezed to obtain a high yield of juice. The wet pulp below pushes on the drier pulp and forces it out.

12 Claims, 6 Drawing Figures

JUICE EXTRACTOR WITH AUTOMATIC PULP DISCHARGE

This invention relates to juice extractors and more particularly, to a juice extractor having a device for controlling the flow of pulp which automatically adjusts itself to retard discharge of the pulp from the juice extractor and thereby result in a high yield of the juice from a given product input quantity.

A variety of juice extractors also known as "juicers" having rotating cutting disks by which products such as vegetables or fruits may be comminuted and the juice extracted therefrom are known in the art. Representative devices are shown in U.S. Pat. No. 3,085,606 to Moline and U.S. Pat. No. 3,100,009 to Drachenberg. A particularly improved juicer is shown in U.S. Pat. No. 4,350,087 to Ramirez. During the operation of typical juicers, the rotating cutting disk functions to produce the comminution of the fruits and/or vegetables and the juice of the comminuted product is liberated with the solid portions of the product being reduced to a pulp which is collected in a filter basket provided with openings or retained in some other foraminous container. In the typical configuration, a perforated filter basket, foraminous container or other porous holding means is provided outwardly of the rotating cutting disk so that by the action of centrifugal force acting on the juice and pulp, the juice and pulp thrown from the cutting disk are received by the filter basket or container and the pulp is retained and held in the interior of the basket as the juice passes through the openings in the basket for collection in the collecting spout or other means for recovering the vegetable and/or fruit juice.

The present invention provides an improvement to the juice extractor art by enabling the more efficient recovery of juice from the product by means of a pulp discharge controlling device which rotates as determined by the electric motor and which functions to exert pressure against the pulp through the centrifugal force at the rotational speeds involved during operation of the juicer to enable the controlled discharge of the pulp from the device thereby increasing the yield of the juice to be obtained. It is possible in this way to prevent too rapid a discharge of the pulp.

In accordance with the general embodiment, the present invention provides a means for separating the liquid portion of a vegetable or fruit product from its solid or pulp portions through an extractor apparatus comprising a base, a motor means mounted on the base for rotating a spindle, a cutting disk associated with the spindle for positive rotation thereby, means for introducing the vegetable or fruit product to be juiced to the cutting disk, foraminate means mounted on the spindle for collecting and retaining the solid pulp portions of the vegetable or fruit product and for allowing the liquid portion to pass radially outwardly through openings in said foraminate means, movable pulp discharge control means associated with said foraminate means and defining a surface which automatically adjust to exert pressure on the pulp located in said foraminate means to thereby enable controlled discharge of pulp from the extractor.

Three different embodiments of the invention are described herein with respect to the means for controlling the pulp discharge. Also provided are collection means for collecting the liquid portion and juice, said means being located generally outwardly and downwardly of said foraminate means. The juicer may have the general configuration of the juicers known in the art or the improved juicer shown in U.S. Pat. No. 4,350,087 to Ramirez modified to include the means for controlling pulp discharge as described herein. The disclosure of the Ramirez patent is relied on and incorporated herein by reference.

Therefore in accordance with the general aspects of the invention, the juice extractor comprises an apparatus for separating a liquid portion of a fruit or vegetable product from a solid portion, including a base or lower compartment and an upper compartment, a motor mounted on the base in the lower compartment for rotating a spindle, a cutting disk which may be rigidly mounted on the spindle for positive rotation of the cutting means, a chute or opening means for introducing the vegetable or fruit product to be juiced to the cutting disk, foraminate means, such as a filter basket, in the upper compartment capable of rotating and for collecting and retaining the solid portions of the product and allowing liquid portion of the fruit and/or vegetable to pass radially outwardly through openings in these foraminate means, collection means located outwardly and downwardly of said foraminate means for collecting the liquid portion, and automatically adjustable means for controlling the discharge of said pulp, said means capable of exerting pressure on the extracted pulp to maximize extraction of juices thereby.

Generally, the cutting disk has a plurality of upstanding blades or other cutting surfaces which effect the comminution and pulping of the product. It can be rigidly mounted on the motor spindle or it may be rotated by engagement with the spindle according to any convenient design. The specific design of the cutting disk and cutting surface can vary and any convenient form may be used.

In a more particular embodiment of the invention, the means for controlling the pulp discharge comprises a cylindrical base, rim or band having attached thereto a plurality of vanes sufficient to form an open cup-like configuration completely around the circumference of said cylindrical base thereby forming a circle of vanes. The vanes may themselves be flexible or rigid and are attached to the cylindrical base in such a way that, upon being acted on by the centrifugal force during operation of the juicer, the vanes will flex or tend to expand in an outwardly direction forcing pulp against the walls of the foraminate means which is typically a filter basket. The vanes may be configured in an upwardly and gently outwardly curved arrangement relative to the base. Adjacent vanes overlap each other so that when assuming their position at rest would appear as forming a cup open at top and bottom in a fashion similar to a tulip blossom. The vanes may be flexibly attached to the supporting band or base by any suitable means such as rivets, screws or any convenient fastening means which permits flexing movement of the vanes in an open and outward direction in response to centrifugal forces when in motion. The vanes may be formed of metal or plastic and may be perforated or imperforate.

In a second embodiment of the invention, the means for controlling the discharge of pulp comprises conical means mounted inside the filter basket and including spring tensioned means enabling variable adjustment caused by the centrifugal forces to raise and lower said conical section within said basket to thereby control the rate at which the pulp is discharged.

In the third embodiment of the invention, the juicer contains a means for controlling the pulp discharge in the form of a flat circular disk or plate of a diameter such that it is in overlying relationship with and in contact with the top circumferential flange or lip of the filter basket means when at rest. The plate is attached to the filter basket by fastening means including spring means tensioned so as to enable the variable adjustment of the flat plate to permit an opening between the flat plate and the filter basket during operation due to the centrifugal force whereby pressure can be exerted on the pulp to maximize juice extraction from the pulp.

The cutting disk can be attached to the spindle directly or may be independently mounted on the spindle as shown in Ramirez, U.S. Pat. No. 4,350,087. Channels radiating to the outer circumference of the cutting disk can be present to assist in enabling the liquid portion of the product to travel from the cutting disk to the liquid collection means which can be an annular groove or tray built into the inside wall of the upper compartment. The liquid collection means leads to a spout or spigot for delivery of the liquid juice to the consumer.

Figure 2:
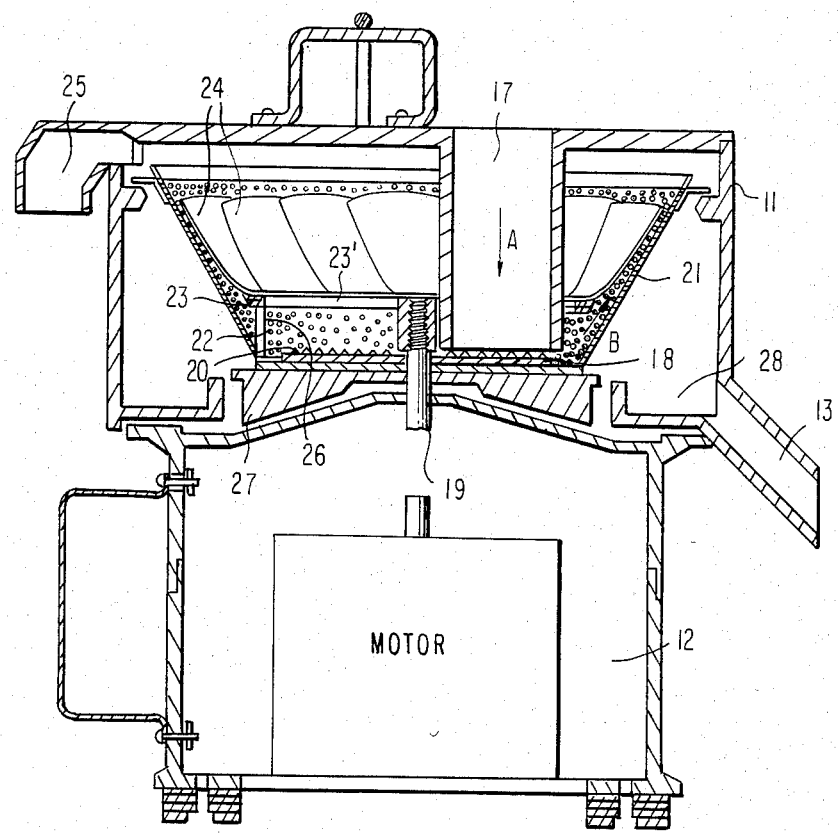
Figure 3:
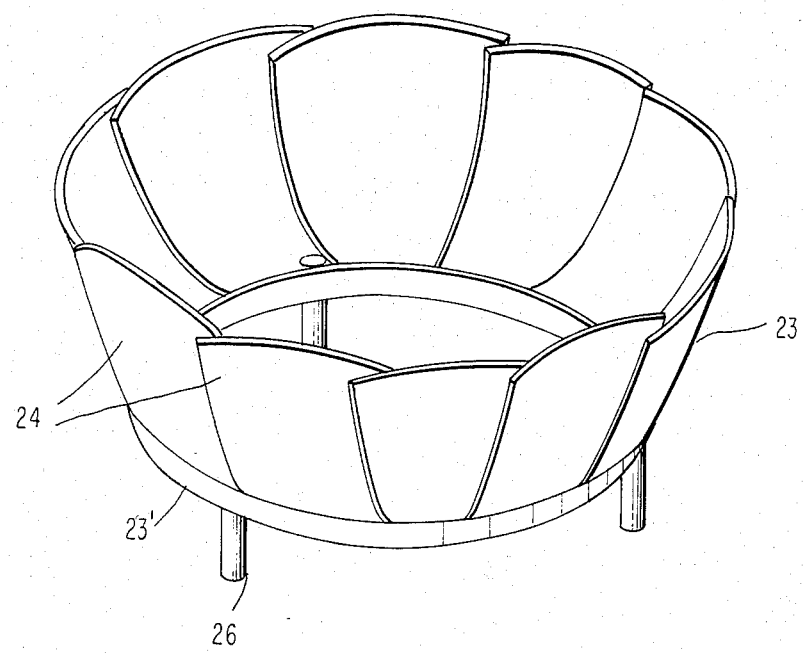
Figure 4:
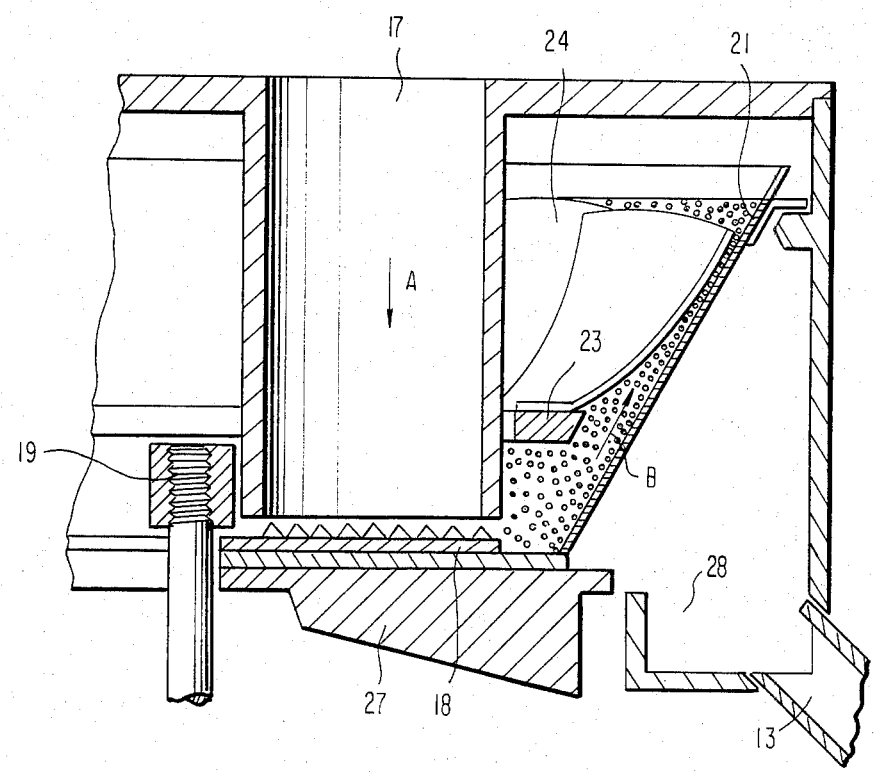
Figure 5:
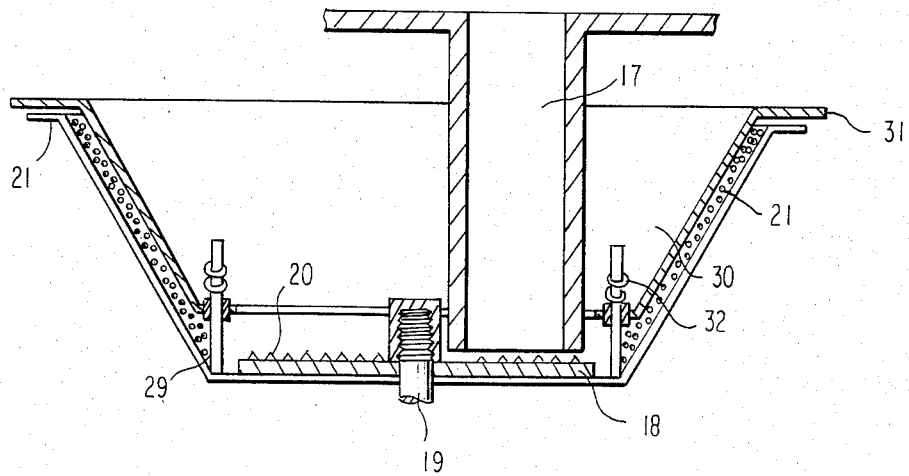
Figure 6:
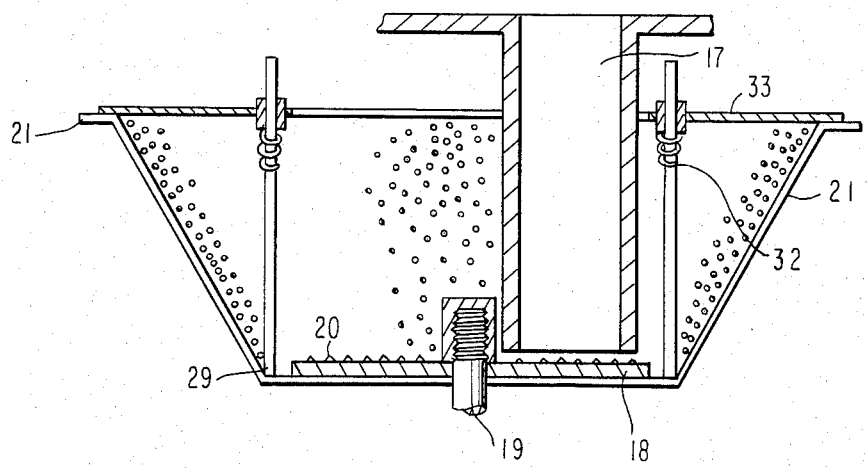

The invention will now be described in the following detailed description thereof in conjunction with the drawings, wherein FIG. 1 is a view of the exterior appearance of a juicer in accordance with the general aspect of the invention, FIG. 2 is a partial cross-sectional view of the juicer in which the improvement according to one embodiment of the invention can be seen, FIG. 3 is an isometric view of a means for controlling discharge of pulp formed of a rim with flexible vanes which is positioned inside the collecting filter basket according to the invention, FIG. 4 is a partial cross-section of a device according to the invention showing greater detail of the embodiment illustrated in FIG. 2, FIG. 5 is a partial cross-sectional view of another embodiment of the invention showing a conical shaped pulp discharge control means fitted inside the filter basket and generally conforming to the shape of said basket, and FIG. 6 is a partial cross-section of another embodiment of the pulp discharge control means of the present invention formed of a flat plate fitted in overlying relationship with the top flange of the filter basket.

Described in further detail, FIG. 1 shows the juicer 10 essentially formed of an upper compartment 11 and a lower compartment 12, the lower compartment containing the electric motor (not shown). Spout 13 is the means by which the juice which is extracted from the vegetable or fruit may be delivered to a beverage cup, container or storage vessel for delivering to the ultimate consumer. Electrical switch 14 functions to turn the juicer motor on and off. The top of compartment 11 may also be removable for cleaning, servicing, and the like. Opening and closing fastening means are shown by 15 although any suitable means may be used which may also incorporate a handle or carrying means. Fastening means 16 may constitute a bolt, screw or other fastening device whereby the upper housing 11 are the lower housing 12 and secured together. Exterior details including handles, spigot or spout, fastening means can be varied widely in design and style as will be apparent to those skilled in the art.

In FIG. 2, entry port 17 is an opening or chute in the device located in the top surface of compartment 11 into which the fruit or vegetable is introduced in the direction of flow indicated by the arrow A. Cutting disk 18 is attached to spindle 19 and has affixed thereto cutting surfaces 20. The cutting disk 18 rotates at the speed determined by the electric motor (now shown) located in the lower compartment 12.

Located generally above and to the side or outwardly of cutting disk 18 is the foraminate means also called a filter basket 21 which collects and retains the solid portion or pulp of the vegetable or fruit. Because of the holes or perforations in the circumferential wall of the basket 21, the liquid juice passes generally radially outwardly through those openings during operation of the device. This is, of course, due to the centrifugal forces which arise as a result of the spinning of the apparatus and contents during operation of the juicer.

The juice which is released from the vegetable or fruit as a result of the grinding action of the cutting surfaces 20 on the entering fruit will flow outwardly through the filter basket 21. The pulp will tend to collect and accumulate in the area immediately above the cutting disks in the area 22. The centrifugal forces acting when the apparatus is in motion act on the pulp and cause the pulp to tend to pass upwardly in the direction indicated by the arrow B.

Attached to the base of the filter basket 21 is a device 23 which is a pulp discharge control means formed of a cylindrical rim or circular band 23' having flexible vanes or fins 24 which are attached to the rim 23 in a manner such that in operation, the vanes 24 will flex and tend to more outwardly when the spindle rotates. In this way due to centrifugal force, the vanes or fins 24 tend to flex outwardly from the rim of the device 23 and press against the upper region of filter basket 21 in a way so as to control; i.e. retard, the flow of the pulp from the area 22 immediately above the cutting surface 20 in the direction indicated by the arrow B. As the vegetable or fruit is introduced in the opening 17, the cutting disk 18 operates to comminute the product and form the pulp. The pulp gradually builds up in the area of 22 and rises in the direction of the arrow A. As the vanes are pushed outwardly against the rising level of pulp, the vanes 24 retard the flow of the heavier, liquid containing pulp until the centrifugal force causes the vanes to squeeze the pulp thereby forcing more liquid to be extracted whereupon the pulp becomes lighter and will be pushed up and out through pulp discharge port 25. The vanes are pressed against the pulp that is located between the surface of vanes 24 and the filter basket wall 21 in such a way as to exert more pressure on the pulp than would normally be the case in the absence of the invention thereby forcing more juice and liquid out through the pores or openings in the wall of filter basket 21. Eventually, the pulp is passed out and discharged with the outlet duct 25 after having sufficient pressure exerted on it by the flexible vanes 24 to extract a higher percentage through outlet 13.

The pulp discharge control means 23 may be attached by the rim 23' to the basket or filter container by screws or other suitable fastening means 26.

Rotator blades 27 located underneath the basket means can be independently mounted onto the spindle 19 of the motor or may be a part of the filter basket. The cutting disk 18 and the basket 21 are not necessarily mounted on the spindle together. An independently mounted arrangement is shown in Ramirez, U.S. Pat. No. 4,350,087.

Liquid collection means are provided in the form of a trough, tray or shelf 28 which is located outwardly and downwardly of the cutting disk and filter basket. Any suitable conventional design may be used for this purpose. The trough connects with spout 13 to deliver the juice to the consumer.

FIG. 3 shows the pulp discharge control means 23 formed of circular rim or band 23' having a plurality of vanes 24 flexibly attached thereto and which in turn may be attached to the basket 21 by fastening means 26. The latter may be bolts, screws or any other convenient means which is not critical for purposes of the invention. The rim 23' is generally rigid, although it may be somewhat flexible. Typically, it is made of metal, but may also be formed of plastic. The vanes 24 can be imperforate or perforated as desired. Metal is the preferred material of construction, although suitable plastic may be used if desired. The vanes 24 are flexible, that is, they are flexibly attached to the rim 23' by suitable means.

The vanes 24 form a complete circle along the top of rim 23' with overlapping adjacent vanes forming a complete or tulip blossom configuration. When spun in operation, the device will unfurl the vanes and the vanes will flex outwardly from the rim and push against pulp located between the outside surface of the vanes and the inside surface of the filter basket.

In FIG. 4, there is a partial cross-sectional view of the device of the invention previously shown in FIG. 2. In this view, the entry port or opening means 17 permits introducing the vegetables and fruit in the direction of flow indicated by the arrow A. The cutting disk 18 can be rigidly connected to the motor spindle 19 and has attached thereto the cutting edges, blades or other implements of comminution 20. Rotators 27 are in depending relationship with filter basket 21 and are generally attached to the basket which in turn is attached in a secure manner to the rotating spindle 19 of the electric motor. The cutting disk 18 may be also secured to the base of the filter basket 21, and rotator 27 apparatus so that they all revolve at the same speed as a unit. Alternately, the basket 21, disk 18 and rotator 27 may be separately attached to the spindle. Various means may be used for securing these members together and/or onto the spindle as may be convenient.

The base of the pulp discharge control means 23 is attached to the base of the filter basket 21 by fastening means which are not shown. The flexible vanes 24 are fastened to the cylindrical rim 23' and function to flex outwardly to a maximum degree determined by the dimensions of the vanes, the basket 21 and the thickness of the pulp located therebetween. The vanes flex outwardly and exert pressure on the pulp which is moving in the direction of the arrow B to force the liquid containing pulp against the walls of the filter means or basket 21 so as to squeeze it and force additional liquid out through the openings of the filter or basket means 21. As the pulp dries and loses liquid, the pulp moves upwardly and out through pulp discharge openings (now shown).

The cutting disk 18 is rotated by the central shaft or a spindle 19 of the electric motor with the rotation speed of the disk depending upon the speed of the motor itself. The spindle can be mounted in any conventional means such as by ballbearings (not shown).

Generally, the entire housing of the juice extractor including the upper and lower compartments 11 and 12, the cutter disk 18 and the pulp discharge control means 23 are cylindrical in shape conforming to the size and dimension as desired by the ultimate manufacturer or consumer. It will be apparent that the entire housing has sufficient ventilation means so as to insure proper ventilation for the motor so that cool air can be drawn in through suitable air inlet means (not shown) to cool the motor and hot air can be discharged through air outlet means (now shown). Further, as will be apparent, the electric motor can be mounted inside the housing by any convenient bolts, brackets or other conventional means.

On the top of the base 12 is the cylindrical upper compartment or housing 11 (see FIG. 1) and on one side thereof, there is the outlet 13 for the juice. This can be a spout, spigot, valve or any desired type of outlet. As a part of the upper housing 11, there is a trough 28 located inside thereof which can be of any convenient size or configuration for collecting the juice and for conveying it for discharge through the spout 13.

The electric motor spindle 19 has a threaded upper end as shown in the drawings and mounted thereon is the cutting disk 18 having a plurality of radially arranged upstanding blades or other cutting surfaces 20. The cutting blades may be attached to the disk by any conventional means such as snap-fit, welding and the like. It is also possible to have a disposable cutting disk mounted on the spindle for periodic replacement. The threaded engagement of the disk 18 with the spindle 19 provides a positive rotation of the cutting disk 18 at the same angular speed as the motor. It will be apparent that any suitable means for engaging the cutter disk 18 with the spindle 19 may be employed.

The filter basket 21 can be clipped, screwed or in any other manner fastened to the rotating disk 18. It may also be independently attached to the spindle. The basket may be made of wire, screen, mesh, perforated metal or plastic, which ever is desirable. The shape of the basket is circular in cross-section taken horizontally and preferably conical in vertical cross-section with the larger diameter at the upper surface. Thus in the preferred aspect, the vertical cross-section of the filter basket generally conforms to the shape of the outwardly flexing vanes 24 as shown in FIG. 4. It will be further apparent that any suitable means may be used for driving the basket in conjunction with the electric motor.

In operation, when the motor is energized, this causes rotation of the spindle 19 and the cutting disk 18. The rotator 27 also rotates along with the filter basket 21 and provides for vibrationless operation.

When the product to be juiced is introduced through the chute or opening 17, the cutting surfaces 20 on the cutting disk 18 comminute the product to a juice and a pulp product. The rotation of the cutting disk 18 imparts a centrifugal force to the juice and the pulp and the pulp is thrown into the filter basket 21 primarily in the area 22, immediately above the cutting blades. The juice, likewise, is thrown outwardly into the basket 21 from which it is then centrifuged through the openings in the basket into the area between the basket and the outer wall of the housing 11 and drips down into the trough 28.

In FIG. 5, there is shown an alternate embodiment of the invention, including the inlet chute or feeder 17 into which the fruit or vegetable to be pulped is introduced. The cutting disk 18 is similarly fitted with the cutting blades 20 and is secured onto the spindle 19 for positive rotation. In this embodiment, the porous basket 21 has attached thereto by means of fastening means 29 a substantially rigid rotating conical shaped device 30 which functions as the pulp discharge control means. The conical shaped device 30 has a flat flange or lip portion 31 which extends over the top edge of the filter basket 21 in overlying relationship. The attaching means 29 include spring means 32 which initially, at rest, hold the conical member 30 in close proximity to the lower surface or base of the filter basket 21. In fact, the top flange 31 may rest on the top edge of the filter basket 21. Alternately, a small space may be present between flange 31 and the top of the basket 21 when at rest. In operation, when the pressure exerted by the rotating pulp attains a certain value related to the tension force of the spring 32, the conical basket 30 is forced upwardly by the pulp being collected by the filter basket 21 thereby creating an opening or larger opening between the flange area 31 of the device 30 and the top of the filter basket 21. With the conical device being forced upwardly, this then enables the relatively dry pulp to move out of the filter basket area and be discharged through pulp discharge opening 25 (not shown).

A still further embodiment of the invention is shown in FIG. 6 which again shows the feeder or chute opening 17, and cutting disk 18 provided by cutting means 20 mounted on the spindle 19. In this embodiment, the filter basket 21 has fitted thereon a flat circular metal plate 33 which extends over the rim of the filter basket 21 and is in overlying relationship therewith. At rest, the flat plate 33 is held in place by fastening means 29 which is provided by spring means 32. The flat metal plate 33 covers in its entirety, the upper opening of the filter basket 21. This flat circular plate 33 is kept in place and attached to the filter basket by attaching means 29 together with spring means 32. The flat plate may rest on the top edge of the filter basket 21 or may be tensioned by spring means 32 to leave a small opening therebetween. When, in operation, the pulp in the basket reaches sufficient volume to create pressure due to the rotational speed of the filter basket and feeding in of contents to be pulped, then the pulp as it is extracted of juice will generally build up and will exert pressure on the underside of plate 33. This causes the plate to raise somewhat thereby permitting the drier pulp to flow out over the upper edge of the filter basket 21 and out through the discharge opening 25 (not shown). This insures that through adjustment of the tension on the springs in the embodiments shown in FIGS. 5 and 6 that the desired degree of compaction of the pulp can be achieved within the filter basket area so as to maximize the juice that can be recovered from the vegetable or fruit that is introduced through opening 17. The attaching means 29 can be screws, pins, bolts or other devices readily apparent to those having ordinary skill in the art.

It will also be apparent that the entire apparatus may be completely or partially constructed of metal. Plastic of high strength and durability may be used for selected components as will be apparent to those in the industry.

Further modifications and variations of the herein described juice extractor will be apparent to those skilled in the art and are intended to be encompassed by the claims appended hereto.

I claim:

1. A juice extractor for juicing a fruit or vegetable product and separating a liquid portion of a fruit or vegetable product from a solid portion thereof comprising a base,
   a motor means mounted on the base for rotating a spindle,
   a cutting disk associated with the spindle for positive rotation of the cutting disk,
   means for introducing the product to be juiced to the cutting disk,
   rotatable foraminate means for retaining the solid portion of the product and allowing the liquid portion to pass outwardly,
   collection means for collecting the liquid portion,
   rotatable and movable pulp discharge control means in association with said foraminate means and defining a surface capable of exerting pressure on pulp located in said foraminate means, to thereby maximize extraction of juices and to control the flow of pulp from the foraminate means,
   said movable pulp discharge control means comprising a cylindrical base having attached thereto a plurality of flexible vanes oriented in an upward direction and with adjacent vanes in overlapping relation and defining a complete circle of vanes, which upon action by centrifugal force will expand in an outwardly direction and thereby decrease the overlapping relation of adjacent vanes.

2. The juice extractor as claimed in claim 1, wherein the cutting disk is rigidly mounted on the spindle.

3. The juice extractor as claimed in claim 1, wherein the foraminate means is mounted on the spindle.

4. The juice extractor as claimed in claim 3, wherein the foraminate means is a conically shaped filter basket.

5. A juice extractor for juicing a fruit or vegetable product and separating a liquid portion of a fruit or vegetable product from a solid portion thereof comprising a base,
   a motor means mounted on the base for rotating a spindle,
   a cutting disk associated with the spindle for positive rotation of the cutting disk,
   means for introducing the product to be juiced to the cutting disk,
   rotatable foraminate means for retaining the solid portion of the product and allowing the liquid portion to pass outwardly,
   collection means for collecting the liquid portion,
   rotatable and movable pulp discharge control means in association with said foraminate means and defining a surface capable of exerting pressure on pulp located in said foraminate means, to thereby maximize extraction of juices and to control the flow of pulp from the foraminate means,
   said pulp discharge control means comprising conical shaped means mounted inside the foraminate means including spring means enabling variable adjustment to raise and lower said conical section within said foraminate means.

6. The juice extractor as claimed in claim 5, wherein the cutting disk is rigidly mounted on the spindle.

7. The juice extractor as claimed in claim 5, wherein the foraminate means is mounted on the spindle.

8. The juice extractor as claimed in claim 7, wherein the foraminate means is a conically shaped filter basket.

9. A juice extractor for juicing a fruit or vegetable product and separating a liquid portion of a fruit or vegetable product from a solid portion thereof comprising a base,
   a motor mean mounted on the base for rotating a spindle,
   a cutting disk associated with the spindle for positive rotation of the cutting disk, means for introducing the product to be juiced to the cutting disk, rotatable foraminate means for retaining the solid portion of the product and allowing the liquid portion to pass outwardly, collection means for collecting the liquid portion, rotatable and movable pulp discharge control means in association with said foraminate means and defining a surface capable of exerting pressure on pulp located in said foraminate means, to thereby maximize extraction of juices and to control the flow of pulp from the foraminate means, said pulp discharge means comprising a flat circular disk plate overlying the foraminate means and attached thereto by fastening means including spring means enabling the variable adjustment of the flat plate to permit an opening between said flat plate and the top edge of the foraminate means.

10. The juice extractor as claimed in claim 9, wherein the cutting disk is rigidly mounted on the spindle.

11. The juice extractor as claimed in claim 9, wherein the foraminate means is mounted on the spindle.

12. The juice extractor is claimed in claim 11, wherein the foraminate means is a conically shaped filter basket.

* * * * *